United States Patent [19]
van Swieten et al.

[11] Patent Number: 5,198,515
[45] Date of Patent: Mar. 30, 1993

[54] BISCITRACONIMIDE COPOLYMERS WITH OLEFINICALLY UNSATURATED MATERIALS

[75] Inventors: Andreas P. van Swieten, Velp; Auke G. Talma, Bathmen; Peter Hope, Twello, all of Netherlands

[73] Assignee: Akzo N.V., Arnhem, Netherlands

[21] Appl. No.: 828,922

[22] PCT Filed: Jul. 6, 1990

[86] PCT No.: PCT/EP90/01077

§ 371 Date: Jan. 30, 1992

§ 102(e) Date: Jan. 30, 1992

[87] PCT Pub. No.: WO91/02013

PCT Pub. Date: Feb. 21, 1991

[30] Foreign Application Priority Data

Aug. 3, 1989 [EP] European Pat. Off. ........ 89202023.1

[51] Int. Cl.$^5$ ............................................ C08F 22/40
[52] U.S. Cl. .................................................... 526/262
[58] Field of Search .......................................... 526/262

[56] References Cited

U.S. PATENT DOCUMENTS 3,380,964  4/1968  Grundschober et al. ............ 260/47
4,568,733  4/1986  Parker et al. ........................ 526/262
5,013,804  5/1991  Kramer ............................... 526/262

FOREIGN PATENT DOCUMENTS 0108461  5/1984  European Pat. Off. .
2010866  7/1979  United Kingdom .

OTHER PUBLICATIONS

"The synthesis of Biscitraconimides and Polybiscitraconimides" Galanti, A. V. and Scola. D. A., *Journ. Polym. Sci. Polymer Chemistry Edition*, vol. 19, pp. 451–475 (1981).

"The Synthesis of Biscitraconamic Acids and Isomeric Bisimide Monomers" Galanti, A. V. et al., *Journ. Polym. Sci.: Polymer Chemistry Edition*, vol. 20, pp. 233–239 (1982).

"The Development of Tough Bismaleimide Resins", Stenzenberger, H. A. et al., 31st Int. SAMPE Symposium, vol. 31, pp. 920–932 (1986).

"Bismaleimide Resins Their Properties and Processing of Compidine BMI resins", Segal, C. L., et al. 17th Nat. Sample Conference, pp. 147–160 (1985).

"Molecular Structure and Properties of Bismaleimide-Styrene Cross-Lined Copolymers", Winter et al., *Proceedings of the 3rd Annual Int. Conf. on Cross-linked Polymers*, Lucenne, CH, pp. 291–303 (1989).

*Primary Examiner*—Joseph L. Schofer
*Assistant Examiner*—Alex H. Walker
*Attorney, Agent, or Firm*—Ralph J. Mancini; Louis A. Morris

[57] ABSTRACT

Curable bisimide compositions containing at least one biscitraconimide having general formula (I), wherein D is a divalent group, R is $CH_2$—$R_1$, and $R_1$ is independently selected from hydrogen and alkyl groups having 1–18 carbon atoms; at least one olefinically unsaturated material, and 0–15 mole percent, based on biscitraconimide of formula (I), of a cocurable material selected from the group consisting of bismaleimides, citraconic maleimides and itaconic maleimides, wherein the mole ratio of biscitraconimide of formula (I), to olefinically unsaturated materials is from 0.12 to 4.0; are disclosed. Also disclosed are copolymeric compositions of biscitraconimides and olefinically unsaturated materials, processes for making these copolymers and articles of manufacture embodying these copolymers. These copolymers exhibit improved thermostability, high glass transition temperature, are solvent resistant and are void-free. In addition, these curable materials are easily processed due to the large melt-cure window, low viscosity of the melt, low melting points of the biscitraconimides and the fact that curing can often be accomplished without additional solvents.

15 Claims, No Drawings

BISCITRACONIMIDE COPOLYMERS WITH OLEFINICALLY UNSATURATED MATERIALS

BACKGROUND OF THE INVENTION

The invention relates to curable biscitraconimide containing compositions, copolymers of biscitraconimides with olefinically unsaturated materials, a process for curing these copolymers, and to articles of manufacture comprising the biscitraconimide(co)polymers.

Biscitraconimides are known compounds and can be prepared by the methods disclosed in, "The Synthesis of Biscitraconimides and Polybiscitraconimides," Galanti, A. V. and Scola, D. A., *Journ. of Poly. Sci.: Polymer Chemistry Edition*, Vol. 19, pp. 451–475, (1981), the disclosure of which is hereby incorporated by reference. These biscitraconimides are polymerized to tough amber-colored films that exhibit good thermal stability. In addition, the article points out that NMR analysis shows that the observed ratio of methyl protons at 2.1 ppm. to the methylene protons at 1.6 ppm. in the biscitraconimides is lower than the theoretical ratios for the imide monomers. The difference is explained as being due to a small degree of polymerization that could occur when the acid is dehydrated thermally.

"The Synthesis of Bisitaconamic Acids and Isomeric Bisimide Monomers," Galanti, A. V. et al., *Journ. Poly. Sci.: Polymer Chemistry Edition*, Vol. 20, pp. 233–239 (1982) also discloses a method for the preparation of biscitraconimides in the form of an isomeric mixture of the citraconic and itaconic imides.

In "The Development of Tough Bismaleimide Resins," Stenzenberger, H. D., et al., *31st International SAMPE Symposium*, Vol. 31, pp.920–932 (1986) it is disclosed that bismaleimides are prime candidates for carbon fiber reinforced composites because of their properties. However, the article also points out that these materials tend to be brittle. Thus, several attempts have been made to improve the fracture toughness of the bismaleimides. First, the bismaleimides have been cocured with reactive elastomers such as carboxy terminated acrylonitrile-butadiene rubbers. Also, the bismaleimide polymers have been modified with comonomers which copolymerize via a linear chain extension reaction and include both diene type copolymerization reactions and "ene"-type copolymerization reaction. Thirdly, the bismaleimides have been modified with thermoplastic materials. Finally, the bismaleimides have been cured in the presence of ionic curing catalysts such as imidazoles and tertiary amines including diazobicyclo-octane (DABCO). Among the alternatives for improving the fracture toughness of the bismaleimides was the incorporation of diallyl benzenes. As shown in table 3 it was found that these materials provided acceptable properties only up to 40 weight percent of the maleimide. Once more than 40 weight percent of the maleimide was employed, a significant decrease in the flexural strength and flexural modulus was observed.

In "Bismaleimide Resins the Properties and Processing of 'Compimide' BMI Resins," Segal, C. L., et al., *17th Nat. SAMPE Conference* 17, pp. 147–160 (1985) formulated bismaleimides are modified with acrylonitrile-butadiene rubbers to produce an increased fracture toughness. However, it was concluded that the rubber is not compatible with the base resin and an additional, pre-reaction step was necessary to accomplish the modification.

Bismaleimide-styrene compositions are known from European Patent Application 0 108,461 published on May 16, 1984, and, "Molecular Structure and Properties of Bismaleimide Styrene Cross-linked Copolymers," Winter, et al., *Proceedings of the 3rd Annual Int. Conf. on Crosslinked Polymers*, Lucerne, Switzerland, pp, 291–303, (1989). Example II of the European Patent application also discloses a copolymer of styrene, acrylic acid, bismaleimide and biscitraconimide. However, this material contains a relatively large amount of the bismaleimide and acrylic acid and thus is quite different from the material in accordance with the present invention. Most importantly, the copolymer including a biscitraconimide disclosed in this patent application has a strain % of 0.9, which is significantly lower than compositions of the present invention.

Finally, UK patent application GB 2,010,866 discloses copolymers of styrene with compounds having an N-substituted imide group including bismaleimides and monomaleimides. In this patent it is briefly mentioned that one of the possible imides that can be employed is N,N'-4,4'-diphenylmethane biscitraconimide. However, no examples using this compound are included, and this compound is an alkylated arylene biscitraconimide.

Generally, the bismaleimide resins require difficult processing conditions, exhibit solvent retention in prepregs, have a high melting point and high curing temperatures are required for the monomer. In addition, the maleimide polymers are often brittle due to the high cross-link density obtained in the network polymers. The foregoing body of prior art reflects the need for bisimide resin systems which are easily processable and exhibit improved mechanical and physical properties.

SUMMARY OF THE INVENTION

The present invention has for its object to eliminate the foregoing drawbacks of the prior art bisimide resins and to substantially improve the thermal properties of molded compositions made from bisimide resins. In addition, it is an object of the present invention to provide bisimide copolymers having low curing temperatures which are easily processable, often without an additional solvent. For this purpose the present invention provides curable bisimide compositions containing at least one biscitraconimide having the general formula

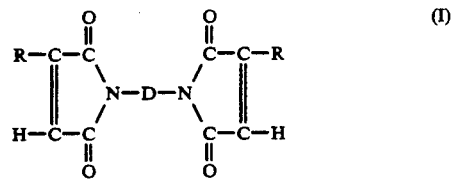

wherein D is a divalent group, R is $CH_2$—$R_1$, and $R_1$ is independently selected from hydrogen and alkyl groups having 1–18 carbon atoms; at least one olefinically unsaturated material selected from the group consisting of styrene, α-methyl styrene, β-pinene, indene, divinyl benzene, propenyl benzene, isopropenyl benzene, substituted styrenes, triallyl cyanurate, triallyl isocyanurate, stilbene, dibenzalacetone and mixtures thereof; and 0–15 mole percent, based on biscitraconimide units of the formula I, of a cocurable material selected from the group consisting of bismaleimides, citraconic maleimides and itaconic maleimides, wherein the mole ratio of biscitraconimide units to olefinically unsaturated material is from 0.12 to 4.0. The present invention also relates to copolymeric compositions of biscitraconimides and olefinically unsaturated materials, processes for making these copolymers and articles of manufacture embodying these copolymers including articles comprising fibrous reinforcement and prepregs.

These polymeric compositions and the articles of manufacture produced therefrom offer several advantages over prior art bisimide formulations. For example, these biscitraconimide-containing materials can be processed at lower temperatures than bismaleimides and the resultant polymers show improved properties, including a high $T_g$ and good thermostability. Further, the mechanical properties of these materials are significantly better than expected from similar, commercially available materials.

DETAILED DESCRIPTION OF THE PREFERRED EMBODIMENTS

Biscitraconimides are known compounds and can be prepared by any of the methods disclosed in Dutch Patent Application No. 6,514,767; "The Synthesis of Biscitraconimides and Polybiscitraconimides", Galanti, A. V., and Scola, D. A., *Journ. of Polym. Sci.: Polymer Chemistry Edition*, Vol. 19, pp. 451-475 (1981); and "The Synthesis of Bisitaconamic Acids and Isomeric Bisimide Monomers", Galanti, A. V., et al., *Journ. of Polym. Sci.: Polymer Chemistry Edition*, Vol. 20, pp. 233-239 (1982), the disclosures of which are hereby incorporated by reference.

The aliphatic biscitraconimides employed in the present invention comprise biscitraconimide compounds having the formula I:

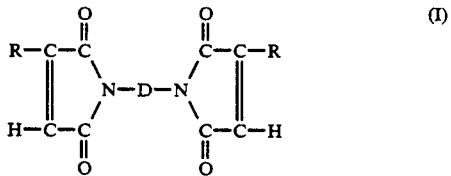

wherein D is a divalent group, R is $CH_2-R_1$, and $R_1$ is independently selected from hydrogen and alkyl groups having 1-18 carbon atoms.

D may be selected from divalent groups including alkylene, cyclicalkylene, arylated alkylene groups, oligomers of biscitraconimides, and residues of one or more cocurable materials and biscitraconimide oligomers. D is preferably selected from a substituted or unsubstituted aliphatic divalent group. Most preferably D is a divalent group selected from ethylene, propylene, methylene, butylene, 2-methylpentylene, hexylene, dimethylene cyclohexane, m-xylylene; and tricyclododecylene.

Arylated alkylene groups are groups wherein the two radicals forming the divalent radical D are obtained by extracting hydrogens from alkyl carbon atoms and at least one of the alkyl carbon atoms have one or more of their remaining hydrogen atoms substituted by an aryl group.

Suitable aliphatic biscitraconimides are in particular N,N'-ethylene-biscitraconic imide;
N,N'-hexamethylene-biscitraconic imide;
N,N'-tetramethylene-biscitraconic imide;
N,N'2-methyl-pentamethylene-biscitraconic imide;
N,N'-propylene-biscitraconic imide;
N,N'-4,4'-dicyclohexylmethane-biscitraconic imide;
N,N'-meta-xylylene biscitraconimide;
N,N'-dicyclohexyl-biscitraconic imide; and
N,N'-α,α'-4,4'-dimethylene cyclohexane-biscitraconic imide.

The olefinically unsaturated materials useful in the present invention include styrene, substituted styrenes, styrene derivatives, triallyl cyanurate, triallyl isocyanurate, and mixtures thereof. Particularly useful styrene derivatives include α-methyl styrene, β-pinene, indene, divinyl benzene, stibene, dibenzalacetone, propenyl benzene and isopropenyl benzene. The most preferred olefinically unsaturated materials for use in the present invention are styrene, styrene derivatives, substituted styrenes and mixtures thereof.

The curable composition may also comprise one or more cocurable materials. Suitable cocurable materials include bismaleimides, citraconic maleimides, itaconic maleimides, citraconic/itaconic maleimides, citraconimides, itaconimides, tris-citraconimides, tris-itaconimides, bisitaconimides, aryl biscitraconimides and alkylated arylene biscitraconimides. Alkylated arylene biscitraconimides are biscitraconimides wherein the citraconimide units are joined by aryl radicals having one or more of the aromatic hydrogen atoms replaced by alkyl groups. For example, N,N'-4,4'-diphenylmethane biscitraconimide is an alkylated arylene biscitraconimide.

When the cocurable material is a maleimide-containing cocurable material, it preferably comprises from 0 to 15 mole percent based on the biscitraconimide of the formula I, of the composition, and more preferably is not present in the composition of the present invention. The remaining listed cocurable materials are often present as impurities in biscitraconimide compositions. They may be present in amounts of from 0-50 mole percent based on the biscitraconimide of the formula I, and more preferably comprise 1-30 mole percent based on the biscitraconimide of the formula I.

The present invention also embodies cured polymeric materials comprising units derived from at least one biscitraconimide of the formula (I); units derived from at least one olefinically unsaturated material; and from 0-15 molar percent, based on the biscitraconimide of the formula I, of units derived from one or more cocurable materials selected from bismaleimides, citraconic maleimides, and itaconic maleimides, wherein the mole ratio of units derived from the biscitraconimide of the formula I to units derived from olefinically unsaturated material is from 0.12 to 4.0. More preferably, the maleimide-containing cocurable materials are not present in the composition and the mole ratio of units derived from the biscitraconimide(s) of the formula I to units derived from olefinically unsaturated material(s) is from 0.25 to 1.35.

These cured polymeric materials may optionally include 0-50 molar percent, based on the biscitraconimide of the formula I, of units derived from at least one cocurable material selected from the group consisting of citraconic/itaconic imides, bisitaconimides, citraconimides, itaconimides, tris-citraconimides, tris-itaconimides, aryl biscitraconimides, and alkylated arylene biscitraconimides. More preferably, these cocurable materials make up 1-30 molar percent of the composition based on the biscitraconimide of the formula I.

Curing may be accomplished thermally or radically, and results in a copolymer of biscitraconimide and the olefinically unsaturated material. At a molar ratio of biscitraconimide to olefinically unsaturated material of 0.5, an alternating copolymer is obtained. All other ratios give some homopolymerization of one of the units.

The curable aliphatic biscitraconimide mixtures with olefinically unsaturated materials, and particularly those with styrene, substituted styrenes and styrene derivatives, have fairly low clear points due to the excellent solubility of the aliphatic biscitraconimides in these materials, as well as the low melting points of the biscitraconimides.

The curable composition of the present invention may be cured in the presence of a curing catalyst. The curing is carried out by simply heating a composition containing at least one aliphatic biscitraconimide of the formula (I), an olefinically unsaturated material, a curing catalyst and, optionally, a cocurable material, to a temperature sufficient to cocure the biscitraconimide and the olefinically unsaturated material, and maintaining the temperature at that level for a sufficient time to cure the material into a cured polymeric product. Curing can be accomplished at 20° C. to 250° C. Generally, the curing will be accomplished at a temperature in excess of 130° C. The curing time will vary depending upon the presence or absence of curing catalyst and type of material present. Conventional curing catalysts for maleimide, itaconimide and citraconimide compositions may be employed. For example, peroxides may be used to catalyse curing at lower temperatures of 20°–120° C., depending on the particular peroxide selected.

The copolymers can be formed without the use of solvents, and no volatiles are formed during the curing reaction, which results in void-free copolymers. The copolymers show improved properties. For example, the thermostability is higher than that expected from styrene-containing commerially available systems. In addition, the $T_g$ values are somewhat higher than for commercially available systems. Further, the copolymers of the present invention are solvent resistant, and simple, monounsaturated materials such as styrene may be used whereas in other systems complex bis-styrenes are required.

The cured polymeric product of the present invention is particularly useful in resin transfer molding and fiber-reinforced composites because of its excellent properties. As a result, a novel composition is obtained which is easily processable due to the low melting points of the biscitraconimides of the formula I. In addition, the biscitraconimides of the formula I have a large melt cure window which allows them to be more readily cocured with a large group of materials which would not be cocurable with bismaleimides because a curing temperature suitable for both the bismaleimide and the cocurable material could not be found. Finally, the biscitraconimide melt itself has a low viscosity which renders it easier to handle than bismaleimide-based melts.

For applications in the laminate field, it is necessary to make prepregs from the biscitraconimides in order to obtain the desired properties for the laminate. The impregnated fibre cloth must be tack-free, flexible and have the proper melt viscosity. The biscitraconimide monomers themselves are not suitable for these applications since they are either oils or are too crystalline in nature.

It is possible to make prepolymers having the desired properties which can be employed to make prepregs with the distinct advantage that these polymers do not require a solvent in the prepreg manufacturing process. In the present commercial prepreg manufacturing methods, solvents must be employed which leads to costly solvent removal steps and some voids in the final product.

The invention will be further described with reference to the following examples which are not to be construed as limiting the scope of the invention.

EXAMPLE 1

30 grams of 1,6-N,N'-hexyl biscitraconimide and 20 grams of styrene are mixed at a temperature of 100° C. (molar ratio of biscitraconimide to styrene of 0.5). The mixture is poured into a preheated mold at 120° C. to prepare an unreinforced sheet of 10×10×0.3 cm. The temperature is slowly increased up to 180° C. and held for three hours. The flexural properties, $T_g$, and TGA values are given in table 1.

EXAMPLE 2

21 grams of 1,6-N,N'-hexyl biscitraconimide and 29 grams of styrene are mixed at a temperature of 100° C. (molar ratio of 0.25). The mixture is poured into a preheated mold and cured as described in Example 1. The properties of the unreinforced sheet are also given in table 1.

EXAMPLE 3

43 grams of 1,6-N,N'-hexyl biscitraconimide and 7 grams of styrene are mixed at a temperature of 100° C. (molar ratio of of 2.0). The mixture is poured into a preheated mold and cured as described in Example 1. The properties of the unreinforced sheet are also given in table 1.

EXAMPLE 4

37.5 grams of 1,5N,N'-2-methylpentyl biscitraconimide and 12.5 grams of styrene are mixed at 60° C. (molar ratio of 1.0). After cooling the mixture to room temperature the mixture retains its low viscosity and can be easily poured into a mold to prepare unreinforced sheets as described in Example 1. The properties of this unreinforced sheet are given in table 1.

EXAMPLE 5

28.5 grams of N,N'-1,6-hexyl biscitraconimide, 16.5 grams of α-methylstyrene and 5.0 grams of styrene are mixed at 100° C. The mixture is poured out in a preheated mold and cured as described in Example 1. The properties of the unreinforced sheet are given in table 1.

EXAMPLE 6

30 grams of N,N'-1,6-hexyl biscitraconimide, 15.5 grams of styrene and 4.5 grams of triallylcyanurate are mixed at 110° C. The mixture is poured into a preheated mold and cured by the procedure described in Example 1. The properties of the unreinforced sheet material are given in table 1.

EXAMPLE 7

29.5 grams of N,N'-meta xylylene biscitraconimide and 20.5 grams of styrene are mixed at 110° C. The mixture is poured into a preheated mold and cured as described in Example 1. The properties of the unreinforced sheet are given in table 1.

TABLE 1

| example | geltime (min) at 130° C. | flexuraltest Emod GPA | strain % | Tg (DMA) | TGA at 400 C (%) |
|---|---|---|---|---|---|
| 1 | 7 | 2.9 | 2.5 | 235 | 3.8 |
| 2 | 5 | 3.0 | 1.1 | 240 | 7.3 |
| 3 | 16 | 2.8 | 4.0 | 185 | 5.4 |
| 4 | 6 | 2.7 | 3.0 | — | 4.0 |
| 5 | 27 | 3.1 | 2.0 | — | 24.8. |
| 6 | 1.5 | 3.4 | 2.0 | 250 | 4.4 |
| 7 | 2.5 | 3.6 | 2.2 | 240 | 3.0 |

EXAMPLE 8

Preparation of Glass Reinforced Sheet Material by Resin Transfer Molding

In order to prepare a 1.6 mm thick glass-reinforced sheet, 10 plies of glass fabric with a suitable sizing are placed in a plain mold. The mold is closed and heated up to 100° C. A mixture of 1,6-N,N'-hexamethylene biscitraconimide and styrene in a molar ratio of 0.5 is injected at 100° C. with a pressure of 3 bar. The mold is filled within 3 minutes.

For curing, the temperature is raised to 130° C. and maintained for 1 hour. Afterwards, the temperature is again increased to 180° C. and maintained for 3 additional hours. The resultant composite material contains 43 vol % of glass. The material exhibited an E-modulus of 15.1 GPa, a maximum strength of 327 MPa, and an elongation at break of 2.6 in a flexural test. The material also had a dielectric constant of 3.9.

EXAMPLE 9

30 grams of 1,5 N,N'-2-methylpentamethylene biscitraconimide and 20 grams of styrene containing 0.05 grams of a peroxide initiator, Perkadox 16 (Bis(4-tert-butyl cyclohexyl) peroxydicarbonate ) are mixed at room temperature. The mixture showed, according to the SPI test (ISO R584), carried out at 50° C., an exotherm of about 172° C. after 23 minutes. The mixture is poured into a mould and cured at 50° C. for 2 hours. The properties have been messured after postcuring at 180° C. (3 hours) and 230° C. (4 hours). The properties, HDT and flexural characteristics, are given in table 2.

TABLE 2

| example no. | flexuraltest E mod N/mm² | Bend str N/mm² | strain % | HDT C |
|---|---|---|---|---|
| 9 | 3300 | 100 | 3.6 | >225 |
| 10 | 3100 | 108 | 4.3 | >225 |
| 11 | 3500 | 100 | 3.3 | >225 |
| 12 | 3400 | 111 | 6.5 | 180 |

*Flexural properties have been measured according ISO 178.
*Heat Distortion Temperature according ISO R 75, method A.

EXAMPLE 10

35 grams of 1,5 N,N'-2-methylpentamethylene biscitraconimide and 15 grams of beta-pinene containing 0.5 grams of Trigonox 145 are mixed at room temperature; the molar ratio biscitraconimide to beta-pinene being 1.2. The mixture is poured into a mould and cured at 140° C. to prepare an unreinforced sheet 15×15×0.4 cm. after gelation the temperature is increased up to 180° C. and held for 3 hours. After postcuring at 230° C. for 4 hours the properties have been determined (see table 2 ).

EXAMPLE 11

A mixture of 25.5 grams of 1,5-N,N'-2-methylpentamethylene biscitraconimide and 4.5 grams of 4,4'-N,N'-methylenedianaline bismaleimide (MDA BMI) is made homogeneous at about 100° C. After cooling to room temperature, 20 grams of styrene containing 0.05 grams of Perkadox 16 and 0.25 grams of Triganox 145 is added to the mixture of bisimides. The molar ratio of bisimide to styrene being 0.5. According to the SPI test, carried out at 50° C., the exotherm appeared after 14 minutes and was at 156° C. The mixture is pured into the mould and cured at 50° C. (1 hour) and 140° C. (2 hours). The properties have been determined after a post curing of 4 hours at 230° C. (see table 2).

EXAMPLE 12

40 grams of 1,6 N,N'-2,2,4-trimethylhexamethylene biscitraconimide and 10 grams of diisopropenyl benzene are mixed at a temperature of 40° C. To the mixture a peroxide, Trigonox 145 (1.5%) and 1,4 diazo-bicyclo octane (1.0%) have been added. The ratio of biscitraconimide to the olefinic unsaturated bonds is 0.9. The mixture is poured into a mould and cured at 140° C. After gelation, the temperature is increased up to 180° C. and held for 2 hours. The properties have been determined after a postcuring at 230° C. for 3 hours. (see table 2).

The foregoing description and examples of the invention have been presented for the purpose of illustration and description only and are not to be construed as limiting the invention to the precise forms disclosed. The scope of the invention is to be determined by the claims appended hereto.

What is claimed is:

1. A composition comprising at least one biscitraconimide having the formula

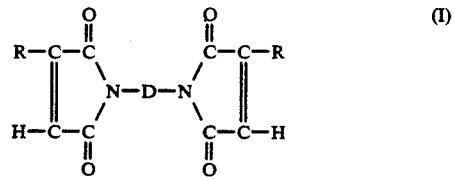

wherein D is a divalent group, R is $CH_2-R_1$, and $R_1$ is selected from the group consisting of hydrogen and alkyl groups having 1 to 18 carbon atoms; at least one olefinically unsaturated material; selected from the group consisting of styrene, α-methyl styrene, β-pinene, indene, divinyl benzene, propenyl benzene, isopropenyl benzene, substituted styrenes, triallyl cyanurate, triallyl isocyanurate, stilbene, dibenzalacetone and mixtures thereof; and from 0–15 mole percent based on the biscitraconimide of the formula I of a cocurable material selected from the group consisting of bismaleimides, citraconic maleimides, and itaconic maleimides; wherein the mole ratio of said biscitraconimide of the formula I, to said olefinically unsaturated material is from 0.12 to 4.0.

2. A composition according to claim 1 wherein said at least one biscitraconimide of the formula I is selected from the group consisting of alkylene biscitraconimides, cyclicalkylene biscitraconimides, and arylated alkylene biscitraconimides.

3. A composition according to any one of claims 1 and 3 wherein D is selected from the group consisting of methylene, ethylene, propylene, butylene, 2-methylpentylene, hexylene, meta xylylene, tricyclododecylene, and dimethylene cyclohexane.

4. A composition according to any one of claims 1 and 2-3 wherein said olefinically unsaturated material is selected from the group consisting of styrene and mixtures of styrene with one or more of indene, α-methyl styrene, β-pinene, divinyl benzene, stilbene, dibenzalacetone, isopropenyl benzene and propenyl benzene.

5. A composition according to any one of claims 1 and 2-4 wherein the mole ratio of said biscitraconimide of the formula I to said olefinically unsaturated material is from 0.25 to 1.35.

6. A composition according to any one of claims 1 and 2-5 further comprising up to 50 mole percent, based on the biscitraconimide of the formula I, of a material selected from the group consisting of citraconic/itaconic imides, bisitaconimides, itaconimides, citraconimides, tris-citraconimides, tris-itaconimides, aromatic biscitraconimides, and alkylated arylene biscitraconimides.

7. A process for the preparation of a copolymer containing at least one unit derived from a biscitraconimide and at least one unit derived from an olefinically unsaturated material, characterized in that a composition according to one or more of claims 1 and 2-6 is cured at a temperature above the melting point of the biscitraconimide unit.

8. An article of manufacture obtained by curing one or more of the compositions according to claims 1 and 2-6.

9. An article of manufacture according to claim 8 further comprising fibrous reinforcement.

10. A prepreg obtained by impregnating fibers with one or more of the compositions of claims 1 and 2-6 and curing the impregnated material at an elevated temperature.

11. A copolymeric composition comprising at least one unit derived from a biscitraconimide having the formula:

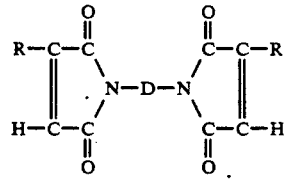

wherein D is a divalent group, R is $CH_2-R_1$ and $R_1$ is independently selected from the group consisting of hydrogen and alkyl groups having 1-18 carbon atoms; at least one unit derived from an olefinically unsaturated material from the group consisting of styrene, substituted styrene, α-methyl styrene, β-pinene, indene, divinyl benzene, stilbene, dibenzalacetone, propenyl benzene, triallyl cyanurate, triallyl isocyanurate, isopropenyl benzene and mixtures thereof; and from 0 to 15 molar percent based on the biscitraconimide units of the formula I, of a cocurable material selected from the group consisting of bismaleimides, citraconic maleimides and itaconic maleimides, wherein the molar ratio of units derived from biscitraconimide of the formula I to units derived from olefinically unsaturated material is from 0.12 to 4.0.

12. A polymeric composition as claimed in claim 11 wherein said at least one unit derived from a biscitraconimide of the formula I is selected from the group consisting of alkylene biscitraconimides, cycloalkylene biscitraconimides and arylated alkylene biscitraconimides.

13. A polymeric composition as claimed in any one of claims 11-12 wherein D is a divalent group selected from the group consisting of methylene, ethylene, propylene, butylene, 2-methylpentylene, hexylene, dimethylene cyclohexane, meta-xylylene and tricyclododecylene.

14. A polymeric composition as claimed in any one of claims 11-12 and 13 further comprising up to 50 molar percent, based on the biscitraconimide units of the formula I, of a cocurable material selected from the group consisting of citraconic/itaconic imides, bisitaconimides, itaconimides, citraconimides, tris-citraconimides, tris-itaconimides, aromatic biscitraconimides, and alkylated arylene biscitraconimides.

15. A polymeric composition as claimed in any one of claims 11-12 and 13-14 wherein the molar ratio of units derived from biscitraconimide of the formula I to units derived from olefinically unsaturated material is from 0.25 to 1.35.

* * * * *